United States Patent [19]

Arai et al.

[11] Patent Number: 4,819,035
[45] Date of Patent: Apr. 4, 1989

[54] COLOR SEPARATION OPTICAL READING APPARATUS

[75] Inventors: Yasunori Arai; Kazushi Yoshida; Takashi Iizuka, all of Tokyo, Japan

[73] Assignee: Asahi Kogaku Kogyo Kabushiki Kaisha, Tokyo, Japan

[21] Appl. No.: 95,590

[22] Filed: Sep. 11, 1987

[30] Foreign Application Priority Data

Sep. 11, 1986 [JP] Japan .................. 61-214758
Sep. 11, 1986 [JP] Japan .................. 61-214759
Oct. 24, 1986 [JP] Japan .................. 61-253404

[51] Int. Cl.⁴ ............................................. G03B 27/52
[52] U.S. Cl. ......................................... 355/55; 355/71
[58] Field of Search ............................. 355/55–57, 355/60, 4, 77, 71

[56] References Cited

U.S. PATENT DOCUMENTS 3,946,222 3/1976 Swanberg .................. 355/60 X

Primary Examiner—L. T. Hix
Assistant Examiner—D. Rutledge
Attorney, Agent, or Firm—Sughrue, Mion, Zinn, Macpeak & Seas

[57] ABSTRACT

A color separation optical reading apparatus having a lighting source for illuminating an object, an imaging optical system for projecting an image of the object illuminated by the lighting source, a light reception member for receiving the light image of the object through the imaging optical system, and a wavelength selection means disposed at a desired location on the optical path between the lighting source and the light receiving member. At least one optical path length correction member is provided between the object and the light receiving member so as to cooperate with the wavelength selection means to correct defocus.

17 Claims, 3 Drawing Sheets

COLOR SEPARATION OPTICAL READING APPARATUS

BACKGROUND OF THE INVENTION

The present invention relates to a color separation optical reading apparatus to be applied to, for example, a facsimile, a scanner, a copying machine, and so on.

In the color separation optical reading apparatus of the kind described above, generally, picture information of an object is read-in through separation into color components of B (blue, 450 nm), G (green, 525 nm), and R (red, 620 nm), and the thus read-in components of information are composed to thereby obtain a color picture. Accordingly, as an imaging optical system in the above-mentioned apparatus, it is necessary to use a lens system capable of performing separation of color information. In the imaging lens system, however, chromatic aberration may be generally generated depending on the wavelength. In this regard, the above-mentioned imaging lens system is different from the conventional monochromatic optical system in which no color separation as well as no high accuracy for reading have been required.

Since the imaging lens system is required to have a large aperture, the depth of focus becomes narrow so that the three colors, B, G and R are deteriorated in performance owing to the residual chromatic aberration in color separation.

It is possible, ideally, to eliminate such chromatic aberration by displacing at least one of the object, the imaging lens system, and the light reception member in the direction of the optical axis with high accuracy in accordance with the selected wavelength of B, G or R and in accordance with the amount of chromatic aberration. However, the control system for the above-mentioned displacement is mechanically complicated and therefore expensive. Accordingly, conventionally, such a simple color separation optical reading apparatus as illustrated in FIG. 1 has been used.

FIG. 1 shows a structure of a conventionally used color scanner. A lighting source 12 and scanning mirrors 13 and 14 are provided below transparent plate glass 11 on which an original (an object) 0 is mounted. The lighting source 12 and the scanning mirrors 13 and 14 are made to scan the original from a position shown by a solid line to another position shown by a broken line in FIG. 1, and the illumination light reflected from the original 0 is reflected by the scanning mirrors 13 and 14 so as to impinge onto a line sensor 17 such as a CCD (i.e., a light receiving member) through a wavelength selection filter (wavelength selection means) 15, and an imaging optical system 16. That is, the whole of the original 0 is read by the line sensor 17. In the conventional apparatus described above, in order to perform color separation, the wavelength selection filter 15 disposed in the optical path between the imaging optical system 16 and the line sensor 17 is switched corresponding to successive ones of the three colors, G, B and R. Alternatively, a wavelength selection means is disposed between the lighting source 12 and the original 0 (including the case in which the wavelength of the lighting source is changed over) and arranged to be switched corresponding to successive ones of the three colors, R, G and B, similarly to the former case. In the respective conditions, the lighting source 12 and the scanning mirrors 13 and 14 are made to scan the original to thereby obtain picture information separated into colors of G, B, and R. In the conventional apparatus, however, there is the following problem.

In FIG. 2, the ordinate axis represents the MTF of the imaging lens for each of the wavelengths of the colors B, G and R and the abscissa axis represents a defocus quantity. Considering the wavelength of the color B, defocus amounts of $\Delta fB_G$ and $\Delta fB_R$ are caused with respect to the wavelengths of the colors G and R, owing to the chromatic aberration of the imaging lens. In the conventional apparatus, in order to minimize the defocus quantity, the line sensor 17 of a CCD or the like is located at a position S, as shown in FIG. 2, at which the defocus is minimum with respect to the wavelengths of the colors B, G and R, so that the MTF values of the colors B, G and R can be obtained in an average manner. However, in the conventional apparatus in which only the position of the line sensor 17 is set to correct defocus caused by chromatic aberration, an optimum MTF value with respect to each wavelength cannot be obtained and therefore a sufficient output cannot be obtained. Further, the smaller the F value of the imaging lens system is, the narrower the width of the MTF value with respect to defocus, so that the MTF value is further lowered at an average focal position.

OBJECTS AND SUMMARY OF THE INVENTION

An object of the present invention is to provide a color separation optical apparatus in which the problems in the above-mentioned conventional apparatus are solved and in which the performance in color separation can be sufficiently maintained.

To this end, according to the present invention, the color separation optical reading apparatus having a wavelength selection means disposed between a lighting source and an object or between the object and a light receiving member, is characterized in that at least one optical path length correction means is further provided in the optical path of an imaging optical system so as to cooperate with the wavelength selection means to correct defocus due to wavelength selection.

Each of the optical path length correction means may be constituted by an optical member having no optical power, or alternatively, at least one of the optical length correction means may be constituted by an optical member having optical power.

The wavelength selection means may be dispensed with if a desired coating is applied to the optical path length correction means.

DESCRIPTION OF THE PREFERRED EMBODIMENTS

Figure 1:
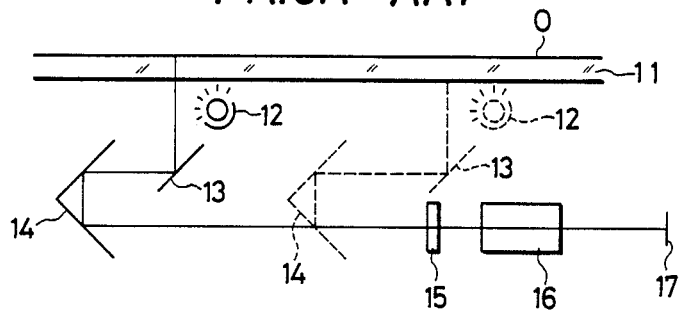
FIG. 1 is a view of an optical system showing an example of a conventional color separation optical reading apparatus.
Figure 2:
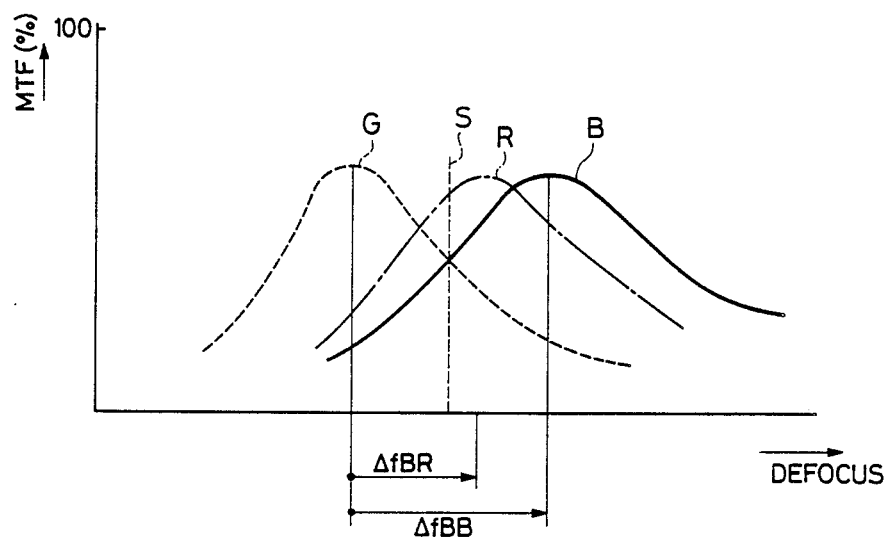
FIG. 2 is a graph showing the MTF value versus the defocus quantity with respect to the wavelengths of the colors G, B and R in the conventional apparatus.
Figure 3:
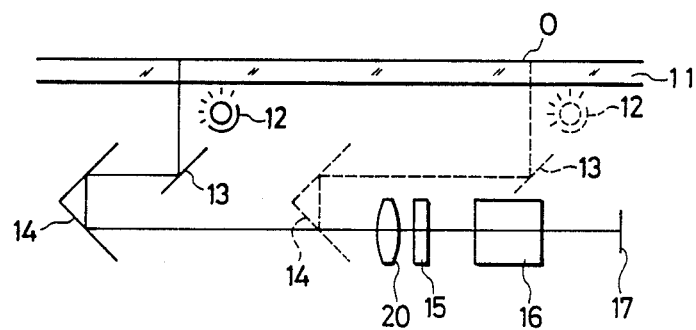
FIG. 3 is a view of an optical system showing an embodiment of the color separation optical reading apparatus according to the present invention.

The present invention will now be described with respect to first embodiment. FIG. 3 is a schematic view of a color separation optical apparatus according to the present invention, in which items the same as those of the conventional apparatus of FIG. 1 are correspondingly referenced. In the present invention, an optical path length correction means having optical power is provided so as to correct defocus due to color separation in cooperation with a wavelength selection filter 15 acting as a wavelength selection means, and in this embodiment, an optical path length correction lens 20 having weak optical power is removably inserted on the object side of an imaging focusing optical system 16 and in front of a wavelength selection filter 15.

Assuming now the optical path length correction lens 20 having power of $\Phi c$ is inserted at a position separated by a distance l from an object point 0, the image 0' of the object point with respect to the imaging optical system 16 is displaced by the optical path length correction lens 20 by $$1/l + 1\{-(l-e)\} = \Phi c \quad (1)$$

$$e = (-\Phi c l^2)/(1 - \Phi c l) \quad (2)$$

Since the image 0' of the object point is displaced by e, the image point changes by $$\Delta = m^2 e = (-m^2 \Phi c l^2)/(1 - \Phi c l) \quad (3)$$

where m represents the imaging magnification of the imaging optical system 16.

Accordingly, when a defocus quantity owing to chromatic aberration with respect to one wavelength from a certain reference wavelength $\lambda_o$ is $\Delta fB$, the defocus owing to the chromatic aberration can be corrected by inserting the correction lens 20 with the values of $\Phi c$ and l suitably selected so as to satisfy the following equation:

$$-\Delta fB\lambda = \Delta = (-m^2 \Phi c l^2)/(1 - \Phi c l) \quad (4)$$

Ideally, the correction lens 20 should be prepared for each of the wavelengths other than the reference wavelength to as to be selectively inserted. For the sake of simplicity, a correction device which is satisfactory in practical use can be realized even if a single correction lens 20 which is set so as to minimize respective defocus quantities due to chromatic aberration with respect to two wavelengths other than the reference wavelength is inserted. Next, description will be made about specific numerical values of correction examples by use of such a single correction lens 20.

EXAMPLE 1

Data of the imaging optical system 16 (4 groups, 6 elements):

| No. | r | d | Nd | vd |
|---|---|---|---|---|
| 1 | 44.440 | 5.40 | 1.69680 | 55.5 |
| 2 | 132.321 | 1.11 | | |
| 3 | 25.500 | 6.53 | 1.77250 | 49.6 |
| 4 | 59.155 | 4.88 | 1.71736 | 29.5 |
| 5 | 16.830 | 19.65 | | |
| 6 | −16.514 | 1.50 | 1.67270 | 32.1 |
| 7 | −42.706 | 4.66 | 1.77250 | 49.6 |
| 8 | −22.720 | 2.60 | | |
| 9 | −972.000 | 5.30 | 1.69680 | 55.5 |
| 10 | −42.451 | | | |

Date of the optical path length correction lens 20:

| No. | r | d | Nd | vd |
|---|---|---|---|---|
| 1 | 15000 | 2.00 | 1.51633 | 64.1 |
| 2 | ∞ | | | |

The chromatic aberration by the above imaging optical system 16 and the quantity of correction by the correction lens 20 disposed at a point separated by a distance l from the object point 0.

| | Color Wavelength | B 450 nm | G 525 nm | R 620 nm |
|---|---|---|---|---|
| Before correction | Chromatic aberration | +0.093 | 0.00 | +0.080 |
| | l | 308.37 | no | 289.081 |
| After correction | Residual Chromatic aberration | +0.018 | 0.00 | +0.018 |
| | Magnification | −0.1693× | −0.1684× | −0.1693× |

Thus, even in the case where such a single correction 20 is prepared and inserted at a point of a distance of l when the selected wavelength is for the color B and R, the chromatic aberration can be eliminated to an extent that no trouble is caused in practical use. Thus, chromatic aberration can be eliminated by a simple removably inserted mechanism.

EXAMPLE 2

Although the optical path length correction lens 20 is inserted between the original and the imaging optical system in the Example 1, the correction lens may be inserted on the image side of the imaging optical system 16. The data of the Example 2 are those obtained in the latter case, and the setting distance l' of the correction lens 20 is the distance from the imaging optical system 16. Further, the data of the imaging optical system 16 are the same as those in the Example 1.

Date of the optical path length correction lens 20:

| No. | r | d | Nd | vd |
|---|---|---|---|---|
| 1 | 500 | 2.00 | 1.51633 | 64.1 |
| 2 | ∞ | | | |

The chromatic aberration by the above imaging optical system 16 and the quantity of correction by the correction lens 20:

| | Color Wavelength | B 450 nm | G 525 nm | R 620 nm |
|---|---|---|---|---|
| Before correction | chromatic aberration | +0.093 | 0.00 | +0.080 |
| | l' | 20.83 | no | 20.83 |
| After correction | Residual chromatic aberration | +0.003 | 0.00 | +0.004 |
| | Magnification | −0.1638× | −0.1684× | −0.1638× |

| -continued | | | |
|---|---|---|---|
| Color | B | G | R |
| Wavelength | 450 nm | 525 nm | 620 nm |
| tion | | | |

In this Example 2, the correction lens 20 is made to be identical not only in shape but in position of insertion so that the insertion/removal mechanism can be made more simply.

Figure 4:
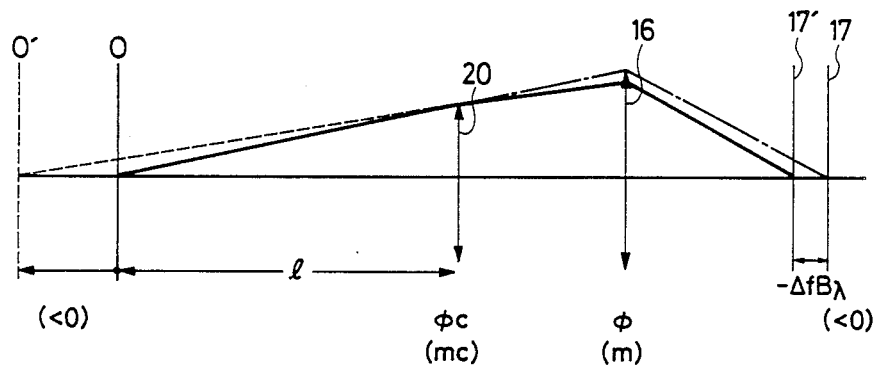
FIG. 4 is a view of an optical path showing a state of optical path length correction according to the present invention.

According to the present invention, the correction of chromatic aberration can be corrected more preferably by making the position of the optical path length correction lens 20 adjustable along the optical axis. In FIG. 4, the quantity δI of displacement of a focal plane 17 when the correction lens 20 is moved by a distance δc along the optical axis is given by the following equation:

$$\delta I = (1 - mc^2) m^2 \delta c \tag{5}$$

where mc represents the imaging magnification of the correction lens 20 and m represents the imaging magnification of the imaging optical system 16.

Accordingly, if an error is caused in the change in quantity of the chromatic aberration of the imaging optical system 16, in the power Φc of the correction lens 20 during manufacture, or the like the error can be corrected by adjusting the position of the correction lens 20 in accordance with the above-mentioned equation (5). Accordingly it is possible to provide an excellent color separation reading apparatus.

The optical path length correction lens 20 and the wave-length selection means may be constituted by one and the same member. This can be easily realized by working a colored filter into a shape of the correction lens 20 or a coating of film having wavelength selection property is provided on the surface of the correction lens. By such an arrangement, the wavelength selection as well as optical path length correction can be carried out by using a single optical member, so that it is possible to obtain a color separation optical apparatus of high performance with a simple structure without increasing the number of parts as well as the space and to expect reduction in cost.

As described above, according to the present invention, in an optical apparatus in which reading is carried out through color separation defocus due to chromatic aberration which can be hardly corrected by only an imaging optical system can be easily corrected by an optical path length correction means having optical power, and a good output can be obtained even in wavelength changing-over.

Figure 5:
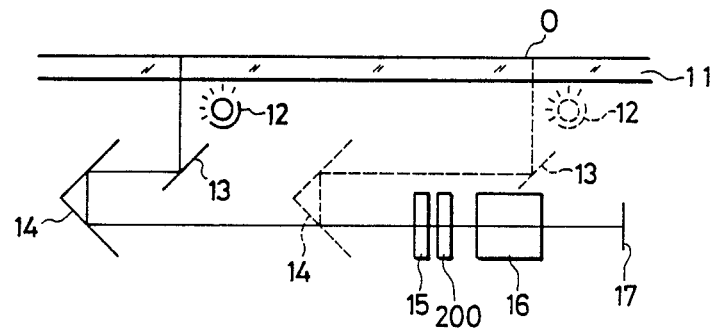
FIGS. 5 and 6 show other embodiments of the invention.

Another embodiment of the present invention will be described. FIG. 5 is a schematic view of a color separation optical apparatus according to this embodiment, in which items the same as those of the apparatus of FIG. 3 are correspondingly referenced. In the present invention, an optical path length correction means is provided so as to correct defocus due to color separation in cooperation with a wavelength selection filter 15 acting as a wavelength selection means, and in this embodiment, a biplanar glass plate (parallel-plane light transmission plate) 200 acting as the optical path length correction means is selectively inserted in the optical path on the object (original) side of an imaging optical system 16, that is, between the imaging optical system 16 and the wavelength selection filter 15 acting as the wavelength selection means. The parallel-plane glass plate is an optical member having no optical power.

Although the biplanar glass 200 may be provided on the image side of the imaging optical system 16, that is, between the imaging optical system 1 and the line sensor 17, the variation of chromatic aberration by the biplanar glass 200 can be minimized when the glass 200 is provided on the object (original) side of the imaging optical system 16.

When the imaging magnification is selected to be m and if a biplanar glass having a thickness of t and a refractive index of n is inserted on the object side of the imaging optical system 16, the position of the image point changes in accordance with the following expression (6).

$$\Delta = m^2 (\{(n-1)/n\} \cdot t \tag{6}$$

Accordingly, when a defocus quantity owing to chromatic aberration with respect to one wavelength from a certain reference wavelength $\lambda_o$ is fBα, the defocus owing to the chromatic aberration can be corrected by substituting n=nλ and t=tλ in the above expression (6) as follows:

$$-fB = \Delta\lambda = m^2 \{l(n\lambda - 1)/n\lambda\} \cdot t\lambda \tag{7}$$

A specific numerical example is described hereunder. In the example, biplanar glass plates 200 each of which has a refractive index $n_G = 1.52$ and which are different in thickness tλ as shown in the table below are inserted between the imaging optical system 16 and the wavelength selection filter 15 selectively in accordance with the selected wavelength of the color G or R. ΔfB represents the defocus quantity due to chromatic aberration (ΔfBλ=fBλfBB). When the color B is selected, the glass plate 200 is not inserted.

| | Color<br>Wavelength | B<br>450 nm | G<br>525 nm | R<br>620 nm |
|---|---|---|---|---|
| Before correction | fBλ<br>Magnification | 0<br>−0.1680 | −0.095<br>−0.1678 | −0.017<br>−0.1679 |
| After correction | tλ<br>ΔfBλ<br>Magnification | 0<br>0<br>−0.1680 | 9.600 mm<br>0<br>−0.1691 | 1.400 mm<br>0<br>−0.1681 |

The thickness of the parallel-plane glass plate 200 is sufficient if the difference in thickness between the biplanar glass plate 200 and the reference wavelength can satisfy the thickness tλ in the table above. Accordingly, quite the same effect can be obtained if the biplanar glass plates 200 respectively having the following thicknesses set as follows are selectively inserted:

0.400 mm for the color B;
10,000 mm for the color G; and
1.800 mm for the color R.

In the above-mentioned example, the parallel-plane glass plates 20 which are made different in thickness correspondingly to the wavelengths of the colors G, B and R are used as the optical path length correction means. However, as apparent from the expressions (6) and (7), the correction quantity Δ may be varied by using glass plate 200 which are made different in refractive index. Assuming now that two kinds of glass plates each having the same thickness t and respectively having the different refractive indexes of $n_1$ and $n_2$ are prepared; the effect of correction is as follows.

$$\Delta_1 = \{(n_1 - 1/n_1)\} \cdot t \quad (8)$$

$$\Delta_2 = \{(n_2 - 1/n_2)\} \cdot t \quad (9)$$

If two kinds of glass materials respectively refractive indexes of $n_1 = 1.52$ and $n_2 = 1.80$, the equation (8) and (9) becomes as follows:

$$\Delta_1 = 0.324 \cdot t$$

$$\Delta_2 = 0.444 \cdot t$$

Accordingly, the optical length difference $\Delta_1 - \Delta_2 0.102 \cdot t$ can be corrected. Thus, by properly selecting the refractive indexes, the optical length can be corrected.

Further, alternatively, the optical path length can be corrected by the combination of the selection of the respective thicknesses as well as refractive indexes of the biplanar glass plates, and more effective correction can be performed by such a combination.

The optical path length correction means, which is a feature of the present invention, and the wavelength selection means may be constituted by one and the same members. For example in the case where the wavelength selection filters 15 are used as the wavelength selection means, if the respective plate thicknesses of the wavelength selection filters 15 for the colors B, G and R are made different from each other by the quantity of chromatic aberration correction, the wavelength selection and the optical path length correction can be carried out simultaneously by one and the same wavelength selection filter 15. Therefore, with such an arrangement, it is possible to obtain a color separation optical apparatus of high performance with a simple structure without increasing in number of the parts as well as in space and it is possible to expect reduction in cost.

Referring back to FIG. 3, the color separation optical reading apparatus is already proposed in which a optical path length correction means 20 is inserted between an original 0 and an imaging optical system 16 so as to prevent the defocus due to chrominace aberration. The optical path length correction means 20 is constituted by a lens having optical power.

However, in the correction by using the optical path length correction means (correction lens) 20, it is impossible to completely correct the magnification while the correction for the chromatic aberration can be carried out. That is, variations are generated in magnification for the colors B, G and R. Accordingly, even if the focal position is made proper by eliminating the chromatic aberration, the variations in magnification prevent effective use of the performance of the focal position.

| | Color Wavelength | B 450 nm | G 525 nm | R 620 nm |
|---|---|---|---|---|
| Before correction | color aberration 1 | +0.093 308.37 | 0.00 no | +0.080 289.081 |
| After correction | Residual color aberration | +0.018 | 0.00 | +0.018 |
| | Magnification | $-0.1693\times$ | $-0.1684\times$ | $-0.1693\times$ |

-continued

| Color Wavelength | B 450 nm | G 525 nm | R 620 nm |
|---|---|---|---|
| Magnification difference $\Delta m$ | $0.0009\times$ $(+0.53\%)$ | 0.00 | $0.0009\times$ $(+0.53\%)$ |

In the table the magnification difference $\Delta m = |m\lambda| - |mG|$.

As seen in this example, a near 1/1000 magnification error is caused for the colors B and R relative to the color G and in some cases this magnification error becomes a significant problem as the color separation optical reading apparatus is desired to be improved in its accuracy.

Figure 6:
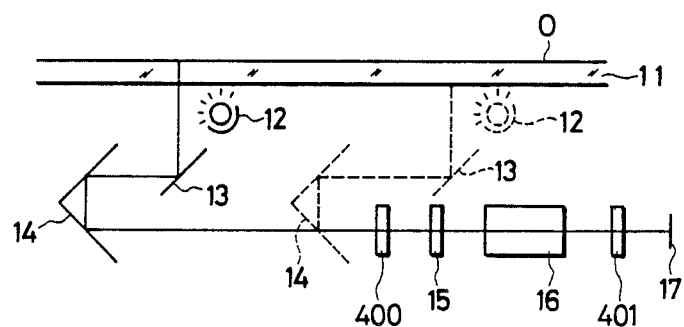

In order to overcome this problem, still another embodiment will be described with reference to FIG. 6, in which items the same as those of the apparatus illustrated in FIG. 3 are correspondingly reference. In FIG. 6, a pair of optical path length correction means 400 and 401 are provided so as to correct defocus due to color separation with a wavelength selection filter 15 acting as a wavelength selection means. The first optical path length correction means 400 is removably inserted in front of the wavelength selection filter 15 disposed on the object side of an imaging optical system 16 and the second optical path length correction means 401 is removably inserted between the imaging optical system 16 and a line sensor 17. Both the first and second optical path length correction means 400 and 401 may be constituted by a correction plate (filter) having no optical power and are changed over in accordance with the selected wavelength by the wavelength selection filter 15. Assuming that the refractive index and the thickness of the first correction plate 400 are represented by $n_A$ and $t_A$, respectively, the image of the objection with respect to the imaging optical system 16 is shifted by this correction plate 20 by a distance $$e = (n_A - 1) t_A / n_a \quad (10)$$

Assuming that the magnification of the imaging optical system 16 is represented by the quantity of change $\Delta FB$ of the FB becomes $$\Delta FB(A) = m^2 e \quad (11)$$

by the displacement of the object point. By the insertion of the correction plate 400, the magnification $m'$ after correction becomes as follows:

$$m' = -\{(b + m^2 e)/(a - e)\} \quad (12)$$

where a represents the distance between the object point and the first principal point of the imaging optical system 16, and b represents the distance between the second principal point of the imaging optical system 16 and the image point.

Similarly to this assuming that the refractive index and the thickness of the second correction plate 401 are represented by $n_b$ and $t_b$, respectively, the image point with respect to the imaging optical system 16 is changed by this correction plate 401 by $$\Delta FB(A) = (n_A - 1) t_B / n_B \quad (13)$$

Accordingly, if proper correction plates 400 and 401 are switched/inserted so as to cooperated with each other with respect to the selected wavelength by the wavelength selection filter 15, the defocus due to chromatic aberration as well as the variations in magnification can be corrected at the same time.

The effects of the present invention will be described hereunder with respect to examples thereof.

EXAMPLE 3

Date of the imaging optical system 16 (4 groups 6 elements):

| No. | r | d | Nd | νd |
|---|---|---|---|---|
| 1 | 44.440 | 5.40 | 1.69680 | 55.5 |
| 2 | 132.321 | 1.11 | | |
| 3 | 25.500 | 6.53 | 1.77250 | 49.6 |
| 4 | 59.155 | 4.88 | 1.71736 | 29.5 |
| 5 | 16.830 | 19.65 | | |
| 6 | −16.514 | 1.50 | 1.67170 | 32.1 |
| 7 | −42.706 | 4.66 | 1.77250 | 49.6 |
| 8 | −22.720 | 2.60 | | |
| 9 | −972.000 | 5.30 | 1.69680 | 55.5 |
| 10 | −42.451 | | | |

Data of the correction plates 400 and 401: In each of the plates 400 and 401, Nd=1.51633 and d=64.1.

| Wavelength | B 450 nm | G 525 nm | R 620 nm |
|---|---|---|---|
| $t_A$ | no | 1.55 | 0.72 |
| $t_B$ | 0.68 | 0.91 | 0.70 |

The numerical values of correction by the correction plates 400 and 401:

| | Color Wavelength | B 450 nm | G 525 nm | R 620 nm |
|---|---|---|---|---|
| Before correction | Chromatic aberration | +0.093 | 0.00 | +0.080 |
| | magnification | −0.1686× | −0.1684× | −0.1685× |
| After correction | Residual chromatic aberration | +0.001 | 0.00 | −0.001 |
| | Magnification | −0.1685× | −0.1685× | −0.1685× |

EXAMPLE 4

Data of the imaging optical system 16 (7 groups 7 elements):

| No. | r | d | Nd | νd |
|---|---|---|---|---|
| 1 | 46.311 | 5.50 | 1.60311 | 60.7 |
| 2 | 127.164 | 2.00 | | |
| 3 | −666.343 | 2.50 | 1.54072 | 47.2 |
| 4 | 45.225 | 9.35 | | |
| 5 | 68.597 | 4.92 | 1.70000 | 48.1 |
| 6 | −115.000 | 6.49 | | |
| 7 | −54.636 | 2.25 | 1.62004 | 36.6 |
| 8 | 104.500 | 7.75 | | |
| 9 | −520.629 | 6.50 | 1.65844 | 50.9 |
| 10 | −53.000 | 5.00 | | |
| 11 | −95.504 | 6.70 | 1.61293 | 37.0 |
| 12 | −44.744 | 3.93 | | |
| 13 | −43.350 | 4.00 | 1.70154 | 41.2 |
| 14 | −130.000 | | | |

Data of the correction plates 400 and 401:
In each of the correction plates 400 and 401, Nd=1.51633 and νd=64.1.

| Wavelength | B 450 nm | G 525 nm | R 620 nm |
|---|---|---|---|
| $t_A$ | 3.35 | 3.70 | 2.00 |
| $t_B$ | 1.23 | 1.64 | no |

The numerical values of correction by the correction plates 400 and 401:

| | Color Wavelength | B 450 nm | G 525 nm | R 620 nm |
|---|---|---|---|---|
| Before correction | Color aberration | +0.248 | 0.00 | +1.147 |
| | Magnification | −1.0005× | −1.0000× | −1.0028× |
| After correction | Residual color Aberration | −0.002 | 0.00 | −0.001 |
| | Magnification | −1.0000× | −1.0000× | −1.0000× |

Thus, both the chromatic aberration and magnification can be corrected by the optical path length correction means 400 and 401.

EXAMPLE 5

Both the optical path length correction means 400 and 401 have no optical power in the above Examples 3 and 4, However, it is possible to use optical path length correction means having optical power. In this Example 5, a lens having weak power is used as the correction means 400, so that displacement of the principal points, shift of the object point, and displacement of the image point by means of the correction lens 400 are used and corrected by the 401.

Data of the correction plate 400:

| No. | r | d | Nd | νd |
|---|---|---|---|---|
| 1 | 9900 | 2.00 | 1.51633 | 64.1 |
| 2 | ∞ | | | |

Data of the correction plate 401:
Nd=1.51633 and νd=64.1.

| Wavelength | B 450 nm | G 525 nm | R 620 nm |
|---|---|---|---|
| $t_B$ | 0.70 | 0.88 | 0.69 |

The data of imaging optical system:
The data are the same as those in the "Example 3".
The numerical values of correction by the correction plates 400 and 401:

| | Color Wavelength | B 450 nm | G 525 nm | R 620 nm |
|---|---|---|---|---|
| Before correction | Color aberration | +0.093 | 0.00 | −0.080 |
| | Magnification | −0.1686× | −0.1684× | −0.1685× |
| After correction | Position of correction lens 20 | 422.43 | 409.63 | 433.73 |

-continued

| Color Wavelength | B 450 nm | G 525 nm | R 620 nm |
| --- | --- | --- | --- |
| Residual Color Aberration | 0.00 | 0.00 | 0.00 |
| Magnification | $-0.1685\times$ | $-0.1685\times$ | $-0.1685\times$ |

The position of the correction lens 401 indicates the distance from the imaging optical system 16. The chromatic aberration and the magnification can be corrected at the same time even if the position of insertion of the correction lens 400 having a fixed shaped is changed and the correction plate 401 is inserted in accordance with the correction lens 400.

Further, at least one of the optical path length correction means 400 and 401 and the wavelength selection filter 15 may be constituted by one and the same optical member. For example a colored filter is used as the optical path length correction means 400 or 401, or a coating of film having wavelength selection property is provided on the surface of the means. By such an arrangement, separate provision of the wavelength selection means becomes unnecessary so that it is possible to realize reduction in number of parts, simplification of the structure, and reduction in size.

What is claimed is:

1. A color separation optical reading apparatus comprising a lighting source for illuminating an object, an imaging optical system for projecting an image of said object illuminated by said lighting source, a light reception member for receiving said light image of said object through said imaging optical system, a wavelength selection means disposed between said lighting source and said light receiving member, and an optical path length correction means having optical power, said optical path length correction means being provided in said optical path of said imaging optical system so as to cooperate with said wavelength selection means to correct defocus due to wavelength selection.

2. A color separation optical reading apparatus according to claim 1, in which said optical path length correction means and said wavelength selection means are constituted by the single same optical member.

3. A color separation optical reading apparatus according to claim 2, in which said optical path length correction means is constituted by an optical path length correction lens which is arranged so as to act also as a filter constituting said wavelength selection means.

4. A color separation optical reading apparatus according to claim 1, in which said optical path length correction means is arranged to be adjustable along its position in the optical path.

5. A color separation optical reading apparatus according to claim 1, in which said optical path length correction means includes a single optical member to be inserted into the optical path when a wavelength other than a reference wavelength is selected, said single optical member being capable of minimizing defocus due to chromatic aberration with respect to a plurality of wavelengths other than the reference wavelength.

6. A color separation optical reading apparatus comprising a lighting source for illuminating an object, an imaging optical system for projecting an image of said object illuminated by said lighting source, a light reception member for receiving said light image of said object through said imaging optical system, a wavelength selection means disposed between said lighting source and said object or between said object and said light receiving member, and an optical path length correction means provided in said optical path of said imaging optical system so as to cooperate with said wavelength selection means to correct defocus due to wavelength selection.

7. A color separation optical reading apparatus according to claim 6, in which said optical path length correction means comprises an optical member having no optical power.

8. A color separation optical reading apparatus according to claim 6, in which said optical path length correction means and said wavelength selection means are constituted by the same single member.

9. A color separation optical reading apparatus according to claim 8, in which said optical path length correction means is constituted by properly setting thicknesses of filters acting as said wavelength selection means.

10. A color separation optical reading apparatus according to claim 6, in which said optical path length correction means includes biplanar light transmission plates which are made different in thickness in accordance with the wavelengths selected by said wavelength selection means.

11. A color separation optical reading apparatus according to claim 6, in which said optical path length correction means includes biplanar light transmission plates which are made different in refractive index in accordance with the wavelengths selected by said wavelength selection means.

12. A color separation optical reading apparatus according to claim 6, in which said optical path correction means is disposed between said object and said imaging optical system.

13. A color separation optical reading apparatus comprising a lighting source for illuminating an object, an imaging optical system for projecting an image of said object illuminated by said lighting source, a light reception member for receiving said light image of said object through said imaging optical system, a wavelength selection means disposed between said lighting source and said light receiving member, and a pair of optical path length correction means provided between said object and said imaging optical system and between said imaging optical system and said light receiving member as to cooperate with said wavelength selection means to correct defocus as well as change in magnification due to wavelength selection.

14. A color separation optical reading apparatus according to claim 13, in which said optical path length correction means is constituted by a correction plate having no optical power.

15. A color separation optical reading apparatus according to claim 13, in which said optical path length correction means is constituted by a correction plate having optical power.

16. A color separation optical reading apparatus according to claim 13, in which said optical path length correction means is changed in position of insertion thereof in the optical axis direction in accordance with the selected wavelength.

17. A color separation optical reading apparatus according to claim 1, in which at least one of said pair of optical path length correction means and said wavelength selection means are constituted by the same single optical member.

* * * * *